United States Patent [19]

Miksovsky et al.

[11] 3,988,516

[45] Oct. 26, 1976

[54] MANUFACTURE OF BONDED TEXTILE SHEET STRUCTURES

[75] Inventors: Felix Miksovsky; Rolf Fikentscher, both of Ludwigshafen; Axel Sanner, Frankenthal, all of Germany

[73] Assignee: BASF Aktiengesellschaft, Ludwigshafen (Rhein), Germany

[22] Filed: Jan. 23, 1975

[21] Appl. No.: 543,245

[30] Foreign Application Priority Data

Feb. 1, 1974 Germany............................ 2414794

[52] U.S. Cl.............................. 427/342; 427/340; 427/390 R
[51] Int. Cl.².......................................... B05D 3/10
[58] Field of Search .......... 427/337, 340, 302, 342; 260/239

[56] References Cited

UNITED STATES PATENTS

| | | | |
|---|---|---|---|
| 2,596,200 | 5/1952 | Bestian | 260/239 |
| 3,271,182 | 9/1966 | Varlet | 427/340 |

Primary Examiner—Ronald H. Smith
Assistant Examiner—Janyce A. Bell
Attorney, Agent, or Firm—Johnston, Keil, Thompson & Shurtleff

[57] ABSTRACT

A process for improving the water absorption of textile sheet structures bonded by means of a polymer solution or dispersion, by the application and fixation of a polyglycol ether derivative containing at least two aziridine rings.

7 Claims, No Drawings

MANUFACTURE OF BONDED TEXTILE SHEET STRUCTURES

This invention relates to a process for the manufacture of bonded textile sheet structures by applying a solution or an aqueous dispersion of a polymer to a textile sheet material and solidifying the polymer by drying the impregnated material at elevated temperatures.

In the manufacture of synthetic leather substitutes ("leather-like materials") use is generally made of textile sheet structures mainly consisting of synthetic fibers, preferably random non-woven webs, which are impregnated with polymer dispersions or solutions and then dried so as to effect bonding of the web by coagulation of the polymers. The resulting structures include a top layer having a leather-like appearance. This top layer is usually of polyvinyl chloride or polyurethane. These materials are distinguished by their excellent mechanical properties and a leather-like handle. However, they have only a very poor moisture vapor absorptivity. For example, commercial products show a moisture vapor absorption of 2 to 9 per cent by weight, when a sample which has been stored at 50 per cent relative humidity is subjected to a moisture vapor atmosphere of 90 per cent relative humidity for 24 hours. The moisture vapor absorptivity of natural leather, however, is about 20 per cent by weight under the above conditions. Natural leather is greatly superior to synthetic substitutes as regards the capacity to absorb moisture vapor. However, this absorptive power is of decisive importance in determining the comfort of shoes and articles of clothing in wear or that of upholstery in use.

In the prior art processes for the manufacture of bonded textile sheet structures, either the water vapor absorptive values obtained are low compared with those of natural leather (e.g. U.S. Pat. No. 3,791,849) or the products are too rigid, particularly at low relative humidities (e.g. U.S. Ser. No. 100,779).

It is an object of the invention to provide a process for the manufacture of bonded textile sheet structures showing a high water vapor absorptivity and not exhibiting the above drawbacks.

In accordance with the invention, this object is achieved in a process of the kind described above by applying to the textile sheet structure additionally from 6 to 40 per cent by weight of β-aziridino propionate and/or aziridino succinate of which the alcohol component is an ethylene oxide adduct with water or at least bifunctional compounds containing OH—, $NH_2$— or NH-groups and containing from 2 to 6 carbon atoms, and in which the number of ethylene oxide units per functional group is from 3 to 50, and fixing the aziridino compounds to the textile sheet structure in the presence of crosslinkers consisting of polymers with a K value of from 15 to 100 containing at least 3% by weight on the polymer of carboxyl, hydroxyl, $NH_2$ or NH groups.

By textile sheet structures we mean for example woven, knitted, felted and non-woven fabrics made of synthetic or predominantly snythetic fibers. We prefer to use needle-punched random nonwoven webs. Particularly suitable are those textile web structures which shrink by from about 10 to 70 per cent and preferably from 25 to 50 per cent of their original area when treated by heating and which weigh from 100 to 500 and preferably from 150 to 350 g/m². The thickness of the sheet structures is from 1 to 5 and preferably from 1.5 to 3 mm. The fibers in the webs generally have from 0.7 to 4 denier.

The initially unbonded textile web structures are impregnated with a solution or aqueous dispersion of a polymer acting as binder. Suitable binders are the well-known aqueous polymer dispersions or solutions, particularly solutions in organic solvents. Suitable binder systems are described, for example, in the book by M. Sittig, "Synthetic Leather from Petroleum", Noyes Development, N.J., London 1969, pages 130 to 135, which passage is herein incorporated by reference.

Suitable polymer dispersions contain, for example, homopolymers or copolymers of acrylates or methacrylates. The alcohol component of the esters may be derived from, say, alcohols of from 1 to 12 carbon atoms and preferably of from 2 to 8 carbon atoms. Alternatively, copolymers of butadiene with acrylic acid or methacrylic acid and their derivatives such as acrylonitrile, N-methylolacrylamide and N-methylolmethacrylamide and their ethers with alcohols of from 1 to 4 carbon atoms may be used. The polymer dispersions may also contain so-called heat sensitizers which effect coagulation of the polymers at elevated temperatures, preferably at temperatures of from 35° to 85° C. Examples of suitable heat sensitizers are salts such as calcium chloride and magnesium sulfate, polysiloxanes and water-soluble alkoxylated polyamines showing inverse solubility.

Suitable polymers for processing from organic solvents are, in particular, linear polyurethanes formed from polyetherols or polyesterols, diisocyanates and diols or diamines as chain lengtheners. In particular, use is made of solvents which are miscible with a nonsolvent for the polyurethane, e.g. water and alcohols of from 1 to 4 carbon atoms. Examples of such solvents are dimethylformamide, dimethylacetamide and tetrahydrofuran. The polymers are generally coagulated on the textile web structures by treatment of the solutions with the said nonsolvents.

According to the invention, there is applied to a textile web structure obtained in this manner an aziridino propionate or an aziridino succinate of which the alcohol components are derived from polyglycol ethers containing from 6 to 100 ethylene oxide units or from ethylene oxide adducts with at least bifunctional compounds containing OH, $NH_2$ or NH groups and containing from 2 to 6 carbon atoms and in which the number of ethylene oxide units per functional group is from 3 to 50. Alternatively, the said aziridino compounds may be applied to the textile web structure together with the aqueous dispersion or polymer solution. According to a further modification of the process of the invention, the textile web structures may be first treated with the aziridino compounds and then bonded by means of a binder. This modification is, however, less preferred, since the hydrophilic effect of the aziridino compound is impaired by the binder-polymer coating according to the porosity of the latter.

The β-aziridino propionate derivatives and aziridino succinate derivatives to be used in the invention are known — cf. U.S. Pat. No. 2,596,200, German Published Application No. 1,745,810, French Pat. No. 1,544,210 and R. Huttel, "Fette, Seifen, Anstrichmittel" 64, 2, 107 (1962), which references are herein incorporated by reference. The aziridino compounds are obtained by well-known processes either by acylation of polyether derivatives with carboxylic acids, such as acrylic acid, methacrylic acid, crotonic acid, maleic acid and fumaric acid followed by the addition of ethylene imine to the double bonds of the resulting polyether ester derivatives, or by means of a base-catalyzed (alcoholate or tertiary amine) transesterification of methyl $\beta$-aziridino propionate or ethyl $\beta$-ziridino propionate or of dimethyl or diethyl $\alpha$-aziridino succinate with polyethylene glycol ether derivatives. Using the last-named process, the aziridino compounds obtained are more uniform in quality and show better stability on storage.

Suitable polyethylene glycol ether compounds are adducts of from 3 to 50 ethylene oxide units per functional group with glycols and polyols and compounds containing at least bi-functional $NH_2$ and NH groups, for example ethylene glycol, propylene glycol-1,2, propylene glycol-1,3, hexanediol-1,6, glycerol, trimethylolpropane, pentaerythritol, sorbitol, triethanolamine, ethylenediamine and diethylenetriamine. Of course, compounds are also suitable which contain at least one hydroxyl group and at least one amino- and/or imino group, for example ethanolamine and diethanolamine. The simplest and most preferred polyethylene glycol ether compound is the polyadduct of ethylene oxide with water, i.e. polyethylene glycol containing from 6 to 100 monomer units. Water is equivalent to a diol, since it reacts with ethylene oxide to form ethylene glycol.

The aziridino compounds are fixed on the textile web structure in the presence of compounds containing carboxyl, hydroxyl or NH groups. To this end, it is usually necessary to heat the impregnated textile web structure to temperatures of from 40° to 100° C. Examples of suitable compounds containing carboxyl, hydroxyl or NH groups are those binder systems or those textile web structures which contain the said functional groups in an amount of at least 3 per cent by weight. Preferred compounds for fixing the aziridino compounds are polymers containing carboxyl, hydroxyl or NH groups and having a K value of from 15 to 100. Particular examples of compounds of this kind are homopolymers of ethylenically unsaturated carboxylic acids of 3 or 4 carbon atoms, polyvinyl alcohol and polyethyleneimine.

Alternatively, copolymers of said compounds may be used. Particularly suitable are, for example, polyacrylic acid, polyvinyl alcohol, polyethyleneimine and polymethacrylic acid. The said fixing agents effect crosslinking of the aziridino compounds.

According to the invention, the water vapor absorptivity of textile web structures already bonded with polymer dispersions or polymer solutions may be improved by additionally applying one of the said aziridino compounds or a mixture of suitable compounds. The textile web structures are treated with solutions of the aziridino compounds in the presence of an aqueous dispersion or solution of the said crosslinkers containing carboxyl, hydroxyl or NH groups. On heating, the aziridino compounds form a gel and become firmly bonded to the textile web structure. The water is removed by evaporation at elevated temperature.

The aziridino compounds may, alternatively, be applied to the textile web structure together with polymer dispersions acting as binders. If the binder contains at least 3 per cent by weight of carboxyl, hydroxyl or NH groups, it is not necessary to use a crosslinker for fixing the aziridino compound. However, it is preferred to use such a crosslinker. The textile web structure is first impregnated with the mixture of dispersions and/or solutions of binder, aziridino compound and any crosslinker and is then heated to a temperature of from 40° to 90° C. This causes coagulation of the polymer dispersion and the aziridino compound and the crosslinker form a gel with ring opening and crosslinking. The water is then evaporated off in the usual manner and the polymers are crosslinked, if necessary by continued heating to temperatures of from 110° to 150° C.

In another embodiment of the process of the invention, the textile web structure is first impregnated with an aqueous solution of an aziridino compound, whereupon the impregnated material is heated until gelation occurs, after which the water is removed by evaporation. The thus pre-treated textile web structures may then be bonded with the polymer dispersions or polymer solutions in known manner. In all cases, the textile web structure contains from 6 to 40 per cent by weight of an aziridino propionate or aziridino succinate or a mixture of suitable aziridino compounds. The amount of crosslinker required for fixing the aziridino compounds is from 3 to 40 per cent and preferably from 5 to 20 per cent by weight on the aziridino derivatives, unless, as mentioned before, the binder is capable of functioning as crosslinker, in which case an additional crosslinker is superfluous.

In all of the above embodiments there are obtained bonded textile web structures having a leather-like handle and an improved moisture vapor absorptivity over prior art leather substitutes. The bonded textile web structures manufactured in the manner of the invention, which may, if desired, be provided with a covering layer, are excellent leather-like materials which may be used, for example, in the manufacture of shoes and articles of clothing and upholstery covers.

The invention is described below with reference to the following Examples. The parts and percentages are by weight unless otherwise stated. To determine the water vapor absorptivity, specimens are stored for 24 hours at 50% relative humidity and a temperature of 23° C and then weighed. The specimens are then stored for 24 hours in an atmosphere having a relative humidity of 95 per cent, and then re-weighed. The weight increase in % is given as the water vapor absorptivity. The K values of the polymers were determined by the method proposed by H. Fikentscher in Cellulosechemie 13, pp. 58 to 64 and 71 to 74 (1932) on a 0.5% dimethylformamide solution at 20° C, K being equal to $k \times 10^3$.

PREPARATION OF AZIRIDINO COMPOUNDS $a$ TO $f$

Table I lists data on the manufacture of aziridino compounds $a$ to $f$. The polyethylene glycol ether listed in Table I is obtained by the addition of the equivalents of ethylene oxide given in Table I to one mole of a polyol and is reacted, in the amount given in the Table (in parts) with methyl $\beta$-ethyleneimino propionate in the presence of octane acting as solvent and the catalyst listed in the Table. The reaction mixture is stirred and heated to the boil. The duration of the transesterification operation, the bottoms temperature and the amount of methanol (in parts) which is azeotropically removed from the mixture, are also listed in Table I. The lower organic layer distilled off consists of an octane/methanol solution (20 : 80 party by weight). The octane phase contains virtually no methanol. The reaction mixture is then filtered hot. The residual solvent is then removed in vacuo (up to 0.3 mm of Hg) at a bottoms temperature of up to 70° C. There is obtained a yellow to pale brown residue in an amount given in Table I. The Table also gives the aziridine nitrogen content in said residue.

TABLE I

| Aziridino compound | a | b | c | d | e | f |
|---|---|---|---|---|---|---|
| equivalents of ethylene oxide | 8 | 8 | 17 | 33 | 89 | 9 |
| 1 mole of polyol | glycol | glycol | glycol | glycol | glycol | trimethylolpropane |
| parts of polyethylene glycol ether | 1,242 | 414 | 1,215 | 984 | 786 | 372 |
| parts of methyl β-ethlene-imino propionate | 839 | 310 | 464 | 168 | 52 | 271 |
| molar ratio of aziridine compound to polyether | 2.17 | 2.4 | 2.4 | 2.0 | 2.0 | 3.0 |
| parts of octane | 1,000 | 145 | 500 | 230 | 500 | 500 |
| parts of catalyst | 20 Na-M | 5 DMP | 20 Na-M | 3 DMP | 5 Na-M | 10 Na-M |
| duration of transesterification (hours) | 5.5 | 8.0 | 8.0 | 11 | 4 | 6 |
| bottoms temperature (°C) | 110–121 | 120–150 | 105–125 | 92–150 | 110–122 | 100–125 |
| parts of methanol azeotropically removed | 184 | 65 | 111 | 43 | 12.3 | 60 |
| parts of residue | 1,660 | 601 | 1,451 | 1,098 | 792 | 517 |
| % of aziridine nitrogen in residue | 4.1 | 4.2 | 2.6 | 1.81 | 0.51 | 4.2 |

Na-M = sodium methoxide
DMP = dimethyl palm kernel fatty amine

PREPARATION OF AZIRIDINO SUCCINATE POLYGLYCOL ETHER POLYESTERS g TO i

A polyethylene glycol ether having the average polyethylene oxide content given in Table II below is reacted with dimethyl aziridino succinate in the amounts given in said Table. The reaction conditions are listed in Table II. Methanol and octane are distilled off at the bottoms temperatures given in the Table. The methanol separates as the layer of greater specific gravity (ratio of azeotropically removed methanol to octane is 80 : 20 by weight). The amount of methanol contained in the distillate is also listed in Table II. The reaction mixture is filtered hot. The excess solvent is then distilled off. The residual solvent is removed in vacuo at a pressure of 0.3 mm of Hg and a temperature of not more than 70° C. The amount of brown resinous residue obtained and its content of aziridine nitrogen are given in Table II below.

TABLE II

Preparation of aziridino succinic acid polyglycol ether polyester

| Aziridino succinate | g | h | i |
|---|---|---|---|
| ethylene oxide units in the polyethylene glycol ether | 9 | 18 | 90 |
| parts of polyethylene glycol ether | 621 | 812 | 796 |
| parts of dimethyl aziridino succinate | 281 | 187 | 38 |
| parts of octane | 450 | 500 | 50 |
| parts of catalyst | 10 Na-M | 10 Na-M | 5 Na-M |
| bottoms temperature (° C) | 97–125 | 105–125 | 111–124 |
| duration of azeotropic distillation (hrs) | 6 | 8 | 4 |
| parts of methanol in distillate | 75.7 | 59.6 | 9.9 |
| parts of residue | 771 | 901 | 778 |
| % of aziridine nitrogen in residue | 1.8 | 1.3 | 0.39 |

Na-M = sodium methoxide

PREPARATION OF BONDED TEXTILE WEB STRUCTURES

EXAMPLE 1

A carded web weighing 170 g/m² is prepared from a mixture of 20 parts of high-bulk polyester fibers, 40 parts of rayon staple and 40 parts of 1.3 to 3.0 denier polyamide fibers having a chopped length of from 40 to 60 mm, and the web is needle-punched with 600 punches/cm². This web is laid in a waterbath heated at 75° C for 2 minutes. This causes shrinkage by about 45% in planar area. The web is then squeezed and dried at 120° C. Its weight is then 320 g/m².

20 parts of this web are then impregnated with a solution consisting of 20 parts of the aziridino derivative c above, 2 parts of polyacrylic acid (K value = 60) and 100 parts of water. Following removal of the excess solution by squeezing between rollers, the impregnated web is passed under infrared heaters to effect gelation of the polymer solution. Drying is then effected for 2 hours at 120° C.

The thus pre-treated web is impregnated with a mixture of the following composition:

440 g of a commercial 50% latex based on butadiene and acrylonitrile,
10 g of active zinc oxide,
6 g of colloidal sulfur,
2 g of the zinc salt of 2-mercaptobenzothiazole,
440 g of water and
2 g of commercial heat sensitizer based on alkylene oxide/propylene oxide.

The excess solution is wiped off and the impregnated web is passed under infrared heaters to cause coagulation of the latex. The temperature is from 60° to 70° C. Following removal of most of the water by squeezing, the impregnated web structure is dried at 80° C and then heated for 15 minutes at 140° C. The bonded web is then washed for 1 hour at 60° C, dried and buffed.

The resulting product contains 49% of non-woven web, 17% of hydrophilic agent and 34% of polymer from the dispersion. The moisture vapor absorptivity of the product is 23% and its handle is soft, similar to leather.

The same results are obtained when, in place of the aziridino derivative c, use is made of an aziridino derivative of which the alcohol component is obtained by adding 16 moles of ethylene oxide to 1 mole of hexanediol-1,6.

EXAMPLE 2

The web prepared and impregnated with the aziridino compound c, as described in Example 1 is impregnated with a 20% solution of a commercial polyurethane elastomer having a Shore A hardness of 75 in N,N-dimethyl formamide. Following removal of excess polymer solution by squeezing between rollers, the impregnated web is watered for 3 hours at 25° C, squeezed and washed with warm water at 60° C for 1 hour and finally dried at 120° C in a stream of air. The surface of the product is then buffed.

The material thus obtained consists of 45% of web, 16% of hydrophilic agent and 39% of polyurethane elastomer. It has a leather-like handle and its water absorptivity is 21%.

EXAMPLE 3

140 parts of a solution consisting of 35 parts of the aziridino derivative c, 5 parts of polyacrylic acid (K value = 60) and 100 parts of water are mixed with an aqueous dispersion of the following composition.

190 parts of a commercial 50% latex based on butadiene, acrylonitrile and methacrylic acid,
4 parts of active zinc oxide,
2.6 parts of colloidal sulfur,
0.9 part of the zinc salt of 2-mercaptobenzothiazole, ethylene oxide/propylene oxide copolymer,
1.7 parts of a brown pigment and
50 parts of water.

The web prepared as described in Example 1 is impregnated with the above mixture to saturation. Excess mixture is wiped off. The impregnated web is heated to a temperature of about 60° C by means of infrared heaters irradiating both sides of the web, so as to cause coagulation of the binder system and gelation of the hydrophilic system. The material is then dried at 80° C and heated for 15 minutes at 140° C. The resulting product is washed for 1 hour at 60° C and then dried and buffed. The bonded textile web structure consists of 43% of web, 12% of hydrophilic agent and 45% of polyurethane. It has a pleasant soft handle and its water absorptivity is 18%.

EXAMPLES 4 to 18

The web manufactured as described in Example 1 is impregnated with the following binder system:

440 g of a commercial 50% latex based on butadiene and acrylonitrile (plus 5% w/w of methacrylic acid in Example 16),
10 g of active zinc oxide,
6 g of colloidal sulfur,
2 g of the zinc salt of 2-mercaptobenzothiazole,
2 g of heat sensitizer based on ethylene oxide/propylene oxide copolymer,
4 g of an iron oxide pigment and
440 g of water.

The excess dispersion is wiped off and the impregnated web is passed under infrared heaters to cause coagulation of the dispersion. The impregnated web is then dehydrated by squeezing between rollers, dried at 80° C and heated for 15 minutes at 140° C. In Example 16 the web is heated not above 80° C.

This bonded web is impregnated with the solutions of aziridino compounds listed in Table III below. Following removal of excess solution from the surface of the bonded web by wiping, the impregnated web is passed under infrared heaters. It is heated to 80° C and then dried at 120°C, washed for 1 hour at 60° C, dried at 80° C and finally buffed.

The composition and moisture vapor absorptivity of the resulting products are given in Table III below.

TABLE III

| Ex. No. | Aziridino derivative | parts | crosslinker | K value | parts cross-linker | parts water | composition of bonded web web:binder:agent (%) | moisture vapor absorptivity (%) |
| --- | --- | --- | --- | --- | --- | --- | --- | --- |
| 4 | a | 20 | polyacrylic acid | 60 | 5 | 100 | 38:48:14 | 22 |
| 5 | b | 20 | polyacrylic acid | 60 | 5 | 100 | 35:49:16 | 24 |
| 6 | c | 20 | polyacrylic acid | 60 | 5 | 100 | 37:46:17 | 25 |
| 7 | d | 20 | polyacrylic acid | 60 | 5 | 100 | 38:45:17 | 25 |
| 8 | e | 20 | polyacrylic acid | 60 | 5 | 100 | 39:97:14 | 22 |
| 9 | f | 20 | polyacrylic acid | 60 | 5 | 100 | 36:45:19 | 27 |
| 10 | g | 20 | polyacrylic acid | 60 | 5 | 100 | 39:44:17 | 25 |
| 11 | h | 20 | polyacrylic acid | 60 | 5 | 100 | 37:46:17 | 25 |
| 12 | i | 20 | polyacrylic acid | 60 | 5 | 100 | 38:47:15 | 23 |
| 13 | c | 20 | polyacrylic acid | 60 | 2 | 100 | 38:45:17 | 25 |
| 14 | c | 20 | polyvinyl alcohol[1] | — | 5 | 100 | 39:44:17 | 25 |
| 15 | c | 20 | polyethyleneimine[2] | — | 5 | 100 | 36:49:15 | 23 |
| 16 | c | 20 | carboxyl groups in binder system[3] | — | — | — | 35:50:15 | 23 |
| 17 | c | 20 | polyacrylic acid | 85 | 5 | 100 | 35:52:13 | 20 |
| 18 | c | 20 | polyacrylic acid | 30 | 5 | 100 | 34:52:14 | 21 |

1. Polyvinyl alcohol of partially saponified polyvinyl acetate (degree of saponification 88 per cent molar, viscosity of a 4% aqueous solution at 20° C = 4 cp as measured according to DIN 53015)
2. Polyethyleneimine, molecular weight 200,000
3. In this example the free carboxyl groups in the polymer dispersion effect crosslinking of the aziridino derivatives (the polymer contains 5% of polymerized units of methacrylic acid)
4. Very similar results are obtained if the aziridino derivative described under (f) above is replaced by one in which the alcohol component has been obtained by addition of 9 moles of ethylene oxide to glycerol.

EXAMPLE 19

The web manufactured as described in Example 1 is impregnated with a 20% solution of a commercial polyurethane elastomer having a Shore A hardness of 75 in N,N-dimethylformamide. Following removal of excess impregnation solution from the surface of the impregnated web by squeezing between rollers, the impregnated material is immersed in warm water (25° C) for 1 hour in order to coagulate the polyurethane elastomer, after which it is squeezed and dried at 80° C.

This bonded web is impregnated with the solution of aziridino derivatives and polyacrylic acid described in Example 1. Following removal of the excess solution from the surface of the web by wiping, the impregnated web is passed under infrared heaters. It is then dried for 2 hours at 120° C and then washed in warm water (60° C) for 1 hour, dried and buffed.

The resulting soft material contains 39% of web, 16% of hydrophilic agent and 45% of polyurethane. The moisture vapor absorptivity of the product is 23%.

EXAMPLE 20

The web manufactured in Example 1 is impregnated with a 20% solution of a commercial polyurethane elastomer in N,N-dimethylformamide. Following removal of the excess agent from the surface of the impregnated web by means of squeeze rollers, the impregnated material is immersed in warm water (25° C) for 1 hour to coagulate the polyurethane elastomer, after which it is squeezed and dried at 80° C.

This bonded web is impregnated with the 20% aqueous solution of the aziridino compound described in Example 6. Following removal of the excess solution from the surface of the web by wiping, the impregnated web is passed under infrared heaters. The product is then dried for two hours at 150° C, washed in warm water (60° C) for 1 hour, dried and buffed.

The resulting soft material contains 41% of web, 15% of hydrophilic agent and 44% of polyurethane. The water vapor absorptivity of the product is 20%.

COMPARATIVE EXAMPLE 1

The web manufactured as described in Example 1 is impregnated with the binder system described in Example 3. The excess dispersion is wiped off. The impregnated web is passed under infrared heaters to effect coagulation of the dispersion. The impregnated web is then dehydrated by treatment between squeezing rollers, dried at 80° C and then heated for 15 minutes at 140° C. The product is then washed for 1 hour at 60° C, dried and buffed.

The resulting product contains 52% of web and 48% of binder. The moisture vapor absorptivity is 8%.

COMPARATIVE EXAMPLE 2

The web described in Example 1 is impregnated with a 20% solution of the polyurethane elastomer in N,N-dimethylformamide described in Example 2. Following removal of the excess agent from the surface of the impregnated web by a squeezing roller, the web is immersed in water for two hours at a temperature of 25° C, squeezed, washed in warm water (40° C) for 1 hour, re-squeezed, dried and buffed. The resulting soft product contains 49% of web and 51% of polyurethane. The water vapor absorptivity is 9%.

The above Examples show clearly that the bonded textile web structures manufactured in the manner of the invention are similar to natural leather as regards the moisture vapor absorptivity, whereas the bonded textile web structures prepared by prior art processes exhibit a very poor moisture vapor absorptivity.

We claim:

1. A process for the manufacture of bonded textile sheet structures which comprises applying:
    a. a solution or an aqueous dispersion of a binder-polymer; and
    b. from 6 to 40 percent by weight, based on the textile web structure, of a $\beta$-aziridino propionic acid ester or aziridino succinic acid ester or both of an ethylene oxide adduct with water or with a compound which is at least bifunctional containing OH, $NH_2$ or NH groups and containing from 2 to 6 carbon atoms, and in which the number of ethylene oxide units per functional group in said adduct is from 3 to 50, to a textile sheet structure and solidifying the polymer by drying the impregnated structure at elevated temperatures, followed by fixation of the aziridino compounds on the textile web structure in the presence of 3 to 40% by weight, based on the aziridino compounds, of an organic polymer with a K value of from 15 to 100 containing at least 3% by weight of the polymer of carboxyl, hydroxyl, $NH_2$ or NH groups as crosslinkers.

2. A process as set forth in claim 1, wherein the crosslinker used is a polyacrylic acid.

3. A process as set forth in claim 1, wherein the alcohol component of the aziridino compound consists of an ethylene oxide adduct with water or a glycol of from 2 to 6 carbon atoms or a trifunctional alcohol of from 3 to 6 carbon atoms.

4. A process as set forth in claim 1, wherein the alcohol component of the aziridino compound consists of an ethylene oxide adduct with a compound selected from the group consisting of water, ethylene glycol, propylene glycol-1,2, propylene glycol-1,3, hexanediol-1,6, glycerol, trimethylolpropane, pentaerythritol, sorbitol, mono-, di- and tri-ethanolamines, ethylenediamine and diethylenetriamine.

5. A process as set forth in claim 1, wherein the alcohol component of the aziridino compound consists of a polyglycol ether containing from 6 to 10 ethylene oxide units.

6. A process as set forth in claim 1, wherein the aziridino compound is applied to the textile sheet structure concurrently with the application of the binder-polymer solution or dispersion.

7. A process as set forth in claim 1, wherein the binder-polymer contains at least 3% by weight, based on the polymer, of carboxyl, hydroxyl, amino or imino groups, thus rendering the addition of a crosslinker unnecessary.

* * * * *

UNITED STATES PATENT AND TRADEMARK OFFICE
CERTIFICATE OF CORRECTION

PATENT NO. : 3,988,516
DATED : October 26, 1976
INVENTOR(S) : Felix Miksovsky et al.

It is certified that error appears in the above-identified patent and that said Letters Patent are hereby corrected as shown below:

In Column 10, Line 3 of Claim 5, delete " ... containing from 6 to 10 ethylene ... " and substitute -- ... containing from 6 to 100 ethylene ... --

Signed and Sealed this fifth Day of July 1977

[SEAL]

Attest:

RUTH C. MASON
*Attesting Officer*

C. MARSHALL DANN
*Commissioner of Patents and Trademarks*